(12) United States Patent
Ichioka et al.

(10) Patent No.: US 7,260,280 B2
(45) Date of Patent: Aug. 21, 2007

(54) OPTICAL DEVICE

(75) Inventors: Masayuki Ichioka, Tokyo (JP);
Junichiro Ichikawa, Tokyo (JP);
Sunao Kurimura, Ibaraki (JP); Kenji Kitamura, Ibaraki (JP)

(73) Assignees: Sumitomo Osaka Cement Co., Ltd., Tokyo (JP); National Institute for Materials Science, Ibaraki (JP)

( * ) Notice: Subject to any disclaimer, the term of this patent is extended or adjusted under 35 U.S.C. 154(b) by 0 days.

(21) Appl. No.: 11/500,043

(22) Filed: Aug. 7, 2006

(65) Prior Publication Data
US 2006/0269184 A1      Nov. 30, 2006

Related U.S. Application Data

(62) Division of application No. 11/089,895, filed on Mar. 25, 2005, now Pat. No. 7,174,059.

(30) Foreign Application Priority Data
Mar. 26, 2004   (JP) .............................. 2004-091141
Oct. 5, 2004    (JP) .............................. 2004-292982

(51) Int. Cl.
*G02F 1/295*      (2006.01)

(52) U.S. Cl. ................................... 385/8; 385/4; 385/9
(58) Field of Classification Search ............... 385/1–10
See application file for complete search history.

(56) References Cited

U.S. PATENT DOCUMENTS

2003/0002766 A1*   1/2003   Pruneri et al. .................. 385/2

\* cited by examiner

*Primary Examiner*—Kevin S. Wood
(74) *Attorney, Agent, or Firm*—Chapman and Cutler LLP

(57) ABSTRACT

The present invention provides a highly-integrated and compact optical element and further provides an optical element having various functions such as lower driving voltage, chirping suppression and polarization-independency. The optical element has a substrate 1 formed of a material having an electrooptic effect, a plurality of optical waveguides formed on the substrate, and a modulating electrode for applying electric field into the optical waveguides, and is characterized in that the modulating electrode has at least two branching and confluence lines on the same line for applying the same modulating signal into different optical waveguides.

15 Claims, 10 Drawing Sheets

(a)

(b)

(a)

(b)

OPTICAL DEVICE

This is a division of application Ser. No. 11/089,895 filed Mar. 25, 2005 now U.S. Pat. No. 7,174,059.

BACKGROUND OF THE INVENTION (1) Field of the Invention

The present invention relates to an optical element, and in particular to an optical element wherein optical waveguides formed on different faces of the same substrate are optically connected. In addition, it relates to an optical element for applying the same modulating signal into different optical waveguides.

(2) Related Art Statement

In recent years, external optical modulators such as an optical waveguide device have been widely used in the field of optical communication or the like for the purpose of enabling high-speed switching. Optical waveguide modulators consisting of lithium niobate ($LiNbO_3$; hereinafter referred to as LN), which have features of high frequency characteristic, low insertion loss, high extinction ratio or the like, and optical waveguides formed by thermal diffusion of Ti on said substrate, have been put to practical use.

In improving or adding functions of the optical element such as an optical modulator, the interaction length of an optical waveguide and a modulating electrode for applying electric field into said optical waveguide is designed to be long, or different electrodes having each function are provided, as the conventional ways. For example, a method for lengthening said interaction length for decreasing driving voltage, or a method for separating electrodes for a high frequency electrical signal and for DC bias in view of convenience of modulation control can be cited.

In addition, an optical intensity modulator, phase modulator, and polarization modulator can be cited as the optical modulator. Some of these modulators are combined to form various optical elements.

These cause the optical modulator to grow in size, generating problems that the production costs get higher and that the size of the device using the optical modulator is limited. Moreover, when several electrodes are placed on a limited size substrate, it is not possible to set the electrodes of enough length in relation to the arrangement of electrode.

On the other hand, the following patent document 1 proposes that several optical modulated portions are formed on parallel in the same face of a substrate and a light wave is turned back at the side edge of the substrate to thereby prevent the substrate from increasing in length. However, if several optical modulated portions are placed in parallel as in the patent document 1, the width of the substrate gets larger. The problems that the production costs get higher and the size of the device using the optical modulator is limited still remain unsolved.

[Patent Document 1] Japanese Patent Application Publication No. 2001-350046

In addition, as the example of the optical element, an optical waveguide 102 for guiding a light wave, and a modulating electrode 103 and ground electrodes 104 for applying a electrical high-speed modulating signal into said light wave are formed on a substrate 101 having an electrooptic effect as shown in FIG. 12. FIG. 12(b) is the cross-section view of FIG. 12(a) along the chain line A. Although it is omitted in FIG. 12(a), a buffer layer such as $SiO_2$ is formed between the substrate and the electrode. Optical waveguide 102 is a Mach-Zehnder type optical waveguide (hereinafter referred to as a MZ type optical waveguide) comprising two branching optical waveguides, whereby the light wave being propagated through said optical waveguide receives optical modulation by single modulating electrode 103.

The optical element as in FIG. 12 has high driving voltage related to the optical modulation, and the electric fields applied into two branching optical waveguides are not symmetric. Thus, chirping is generated in the modulated light wave from the optical element, and this could be a cause of limiting distance of transmission. Therefore, for the purpose of lower driving voltage and zero chirp, the optical element comprising two modulating electrodes 105 as shown in FIG. 13, hereinafter referred to as a dual-type element, has been put to practical use. However, it is necessary for the dual type element as shown in FIG. 13 to apply the same amplitude and anti-phase signal into both of modulating electrodes. This setup could cause higher costs since adjustment of the electrical signals gets complicated and the number of components increases.

The patent document 2 discloses that ferroelectric spontaneous polarization (FSP) of one part of a substrate, especially a region of the substrate comprising one branching optical waveguide is reversed, and two modulating electrodes needed in FIG. 13 are composed of modulating electrodes having branching lines that branch from a single line. The optical element utilizing such FSP reversal realizes low driving voltage and zero chirp likewise the dual type element while the setup to apply a modulating signal into the modulating electrodes can be simplified as well as the single modulating electrode as in FIG. 12.

[Patent Document 2] Japanese Patent Application Publication No. 2003-202530

At the same time, the patent document 3 proposes that an optical waveguide formed on a substrate having an electrooptic effect is turned back at one side edge of the substrate in order to shorten the optical element and realize polarization-independency. As shown in FIG. 14, an optical waveguide 110 formed on a substrate 101 is turned back at one side edge (right side of the figure) of the substrate, and modulating electrodes 113 and 115, and ground electrodes 114 and 116 are formed on each branching optical waveguide. The polarization-independent element controlled light locates a reflecting mirror 112 and a ¼ wavelength plate 111 at the turnback so as to rotate the plane of polarization of the propagated light wave by 90 degrees.

[Patent Document 3] Japanese Patent Application Publication No. H07-325276

It is necessary for the optical element having such turnback optical waveguide to use a single modulating electrode 120, for example, as shown in FIG. 15 in order to apply a modulating signal into modulating electrodes 113 and 115. This could cause the problems that driving voltage increases and that chirping is generated as in FIG. 12. 121 and 122 in FIG. 12 show the ground electrodes. If two modulating electrodes as shown in FIG. 13 are used, it becomes necessary to use a jumper lead because signal lines are crossed when connecting electrodes 113 and 115, and electrodes 114 and 116 respectively. This jumper lead could be a cause that propagation loss of the modulating signal dramatically increases.

The present invention intends to solve the above described problems, to provide a highly-integrated and compact optical element, and further, to provide an optical element having various functions such as lower driving voltage, chirping suppression, and polarization-independency.

Moreover, the present invention intends to provide wiring capability of the modulating electrode in the optical element even having the complicated optical waveguides such as the optical waveguide turned back at one side edge of the substrate, and further, capable of realizing low driving voltage and zero chirp.

SUMMARY OF THE INVENTION

In order to solve the above described problems, the invention related to claim 1 provides an optical element comprising a substrate consisting of a material having an electrooptic effect, a top optical waveguide formed on a top face of said substrate, a bottom optical waveguide formed on a bottom face of said substrate, a top modulating electrode for controlling a phase of a light wave being propagated through said top optical waveguide, and a bottom modulating electrode for controlling a phase of a light wave being propagated through said bottom optical waveguide, wherein at least one side edge of said substrate comprises output and input of said optical waveguides formed on said top and bottom faces, and a turnback element is located adjacent to said one side edge to guide the light wave from said output to said input.

Here, "top face" means the face from which the light wave exits and "bottom face" means the face which the light wave enters when the light wave exiting from one face of the substrate enters the other face of the substrate.

The invention related to claim 2 provides the optical element according to claim 1, wherein at least one part of said top modulating electrode or said bottom modulating electrode is formed on a plate-like body apart from said substrate, and said plate-like body is located adjacent to said substrate.

The invention related to claim 3 provides the optical element according to claim 1, wherein said top modulating electrode and said bottom modulating electrode are electrically connected to each other and a high frequency electrical signal traveling through said top modulating electrode continues to travel through said bottom modulating electrode.

The invention related to claim 4 provides the optical element according to claim 3, wherein said electrical connection is performed in a line penetrating said substrate, a line formed on a side edge of said substrate, or a conductive member connected to said substrate.

The invention related to claim 5 provides the optical element according to claim 1, wherein said top optical waveguide and said bottom optical waveguide, being optically connected to each other, respectively comprises at least two optical waveguides, and said optical connections, the location of the optical waveguides and the modulating electrodes on each face and the pattern of said modulating electrodes are configured such that modulation of the light wave being propagated through said two optical waveguides by the top modulating electrode and modulation of the light wave being propagated through said two optical waveguides by the bottom modulating electrode generate changes of refractive index having the same sign to each optical waveguide.

The invention related to claim 6 provides the optical element according to claim 1, wherein said top optical waveguide and said bottom optical waveguide, being optically connected to each other, respectively comprises at least two optical waveguides, and said optical connections, the location of the optical waveguides and the modulating electrodes on each face and the pattern of said modulating electrodes are configured such that modulation of the light wave being propagated through said two optical waveguides by the top modulating electrode and modulation of the light wave being propagated through said two optical waveguides by the bottom modulating electrode generate changes of refractive index having the opposite sign to each optical waveguide.

The invention related to claim 7 provides the optical element according to claim 1, wherein said top optical waveguide and said bottom optical waveguide, being optically connected to each other, respectively comprises at least one optical waveguide, and the location of the optical waveguide and the modulating electrodes on each face and the pattern of said modulating electrodes are configured such that the light wave being propagated through said optical waveguide is modulated mainly by the top modulating electrode in its plane of polarization and said light wave is modulated mainly by the bottom modulating electrode in another plane of polarization.

The invention related to claim 8 provides the optical element according to any of claims 5 to 7, wherein said optical waveguides being optically connected pass through a region having different FSP directions at the top and bottom faces.

The invention related to claim 9 provides an optical element comprising a substrate consisting of a material having an electrooptic effect, several optical waveguides formed on said substrate, and a modulating electrode for applying electric field into said optical waveguides, wherein said modulating electrode comprises at least two branching and confluence lines on the same line for applying a same modulating signal into different optical waveguides.

The invention related to claim 10 provides the optical element according to claim 9, wherein FSP of one part of said substrate comprising the optical waveguides, into which electric field is applied by said branching and confluence lines, is reversed.

The invention related to claim 11 provides the optical element according to any of claims 9 and 10, wherein one portion of said optical waveguides is turned back at a side edge of said substrate, and the branching and confluence lines on the same line are respectively positioned at least before and behind said turnback of optical waveguide.

The invention related to claim 12 provides the optical element according to any of claims 9 to 11, wherein said optical waveguides comprise several Mach-Zehnder type optical waveguides being connected in series, and several branching and confluence lines on the same line are located corresponding to each of said Mach-Zehnder type optical waveguides.

In accordance with the invention related to claim 1, by forming the optical waveguides being turned back at one side edge of the substrate on the top and bottom faces of the substrate, it becomes possible to prevent the optical element from increasing in length and downsize it while the phase of the light waves being propagated through the optical waveguides can be arbitrarily controlled by the modulating electrodes formed on each face. As a result, there can be provided the optical element with various functions.

In accordance with the invention related to claim 2, because one part of the top modulating electrode or the bottom modulating electrode is formed on the plate-like body apart from the substrate, on which the optical waveguides or other electrodes are formed, it is possible to simplify the production process for forming the electrode on the substrate itself. At the same time, it is possible to control the electric field applied into the optical waveguides on the substrate by adjusting the positional relation between the substrate and said plate-like body.

Further, changing an electrode pattern formed on the plate-like body can provide various optical elements.

In accordance with the invention related to claim 3, because the top modulating electrode and bottom modulating electrode are electrically connected to each other and the high frequency electrical signal traveling through the top modulating electrode continues to travel through the bottom modulating electrode, it is possible to lengthen the interaction length of the high frequency electrical signal traveling through the electrode and the light wave being propagated through the optical waveguide without changing the size of the optical element itself.

In accordance with the invention related to claim 4, because the electrical connection of the top modulating electrode and bottom modulating electrode is performed in the line penetrating said substrate, the line formed on the side edge of said substrate, or the conductive member formed on said substrate, it is possible to omit complicated works such as connection of the top modulating electrode and bottom modulating electrode using a thin line. Especially in case of the line penetrating the substrate, it becomes possible to prevent complicated interconnections of the modulating electrodes.

In accordance with the invention related to claim 5, because the top optical waveguide and bottom optical waveguide, being optically connected to each other, respectively comprises at least two optical waveguides, and further, the modulation of the fight wave being propagated through said two optical waveguides by the top modulating electrode and the modulation of the light wave being propagated through said two optical waveguides by the bottom modulating electrode generate changes of refractive index having the same sign to each optical waveguide, it becomes possible to reduce the driving voltage.

In accordance with the invention related to claim 6, because the top optical waveguide and bottom optical waveguide, being optically connected to each other, respectively comprises at least two optical waveguides, and further, the modulation of the light wave being propagated through said two optical waveguides by the top modulating electrode and the modulation of the light wave being propagated through said two optical waveguides by the bottom modulating electrode generate changes of refractive index having the opposite sign to each optical waveguide, it is possible, even when chirping is generated in one face of the substrate by the modulating electrode, to suppress chirping generated in the other face of the substrate. Thus, it becomes possible to realize optical modulation that suppresses chirping.

In accordance with the invention related to claim 7, because the top optical waveguide and bottom optical waveguide, being optically connected to each other, respectively comprises at least one optical waveguide, and further, the light wave being propagated through said optical waveguide is modulated mainly by the top modulating electrode in its plane of polarization and said light wave is modulated mainly by the bottom modulating electrode in another plane of polarization, the different planes of polarization of the same light wave can be modulated at the top and bottom faces of the substrate. Thus, modulation of light wave with any plane of polarization, even if the light wave has a random plane of polarization, is made possible.

In accordance with the invention related to claim 8, because the optical waveguides being optically connected pass through the region having different FSP directions at the top and bottom faces, it is possible to design the optical connection, location of the optical waveguides and modulating electrodes on each face, and pattern of said modulating electrodes more variously.

In accordance with the invention related to claim 9, because the modulating electrode comprises at least two branching and confluence lines on the same line for applying the same modulating signal into different optical waveguides, it is possible to use the branching and confluence lines in a region for applying electric field into the optical waveguides by the modulating electrode (hereinafter referred to as "interaction part" and to use one line when the modulating electrode is wired from one interaction part to another interaction part. Thus, it is possible to prevent several lines from crossing. Further, because there is only one line in wiring the modulating electrode, a difference of propagation loss arising between lines in wiring several lines is not generated.

The branching and confluence line means an electrode that electrically divides one line into several lines and combines the branching lines into one line again. For the electrode using a modulating signal such as a microwave in particular, the length or pattern of the branching lines are configured such that the phases of the microwaves being propagated through the branching lines correspond at the connected point.

In accordance with the invention related to claim 10, because FSP of one part of the substrate comprising the optical waveguides, into which electric field is applied by the branching and confluence lines, is reversed, it is possible to realize modulation in substantially anti-phase condition even when the same modulating signal is applied into different optical waveguides by the electrode branching from the same line. As a result, decreasing of driving voltage of the optical element and zero chirping are made possible.

In accordance with the invention related to claim 11, because one portion of said optical waveguides is turned back at the side edge of the substrate, and the branching and confluence lines on the same line are respectively positioned at least before and behind said turnback of optical waveguide, it is possible to wire top and bottom faces by a single modulating electrode.

In accordance with the invention related to claim 12, because the optical waveguides comprise a portion of several Mach-Zehnder type optical waveguides being connected in series, and several branching and confluence lines on the same line are located on each of said Mach-Zehnder type optical waveguides, it is possible to increase the extinction ratio of a modulated light that exits from the optical element, as well as the effect of the invention related to any of claims 9 to 11. In other words, the modulating signal repeatedly modulates the same light wave on each MZ type optical waveguide. Thus, it becomes possible to increase the extinction ratio of the modulated light every time it passes through said MZ type optical waveguides.

BRIEF DESCRIPTION OF THE DRAWINGS

FIG. 20 is a diagram showing the fourth example of the optical element using the branching and confluence lines related to the present invention; and FIG. 21 is a diagram showing the fifth example of the optical element using the branching and confluence lines related to the present invention.

[Explanations of Numerals]

| 1, 101 | substrate |
|---|---|
| 2-1, 2-2, 2-3, 2-4, 10, 130 | optical waveguide |
| 3 | turnback element |
| 4 | buffer layer |
| 5, 5' | signal electrode |
| 6, 6' | ground electrode |
| a | feeder |
| b, d, 131, 132 | branching and confluence line |
| c | middle line |
| e | output |
| 133, 134 | FSP reversal region |
| 135 | reflecting mirror |

DETAILED DESCRIPTION OF THE INVENTION

In the following, the preferred embodiments of the present invention are explained in detail.

The present invention provides an optical element comprising a substrate consisting of a material having an electrooptic effect, a top optical waveguide formed on the top face of said substrate, a bottom optical waveguide formed on the bottom face of said substrate, a top modulating electrode for controlling the phase of a light wave being propagated through said top optical waveguide, and a bottom modulating electrode for controlling the phase of a light wave being propagated through said bottom optical waveguide, wherein at least one side edge of said substrate comprises output and input of said optical waveguide formed on said top and bottom faces, and a turnback element is located adjacent to said one side edge to guide the light wave from said output to said input.

Figure 1:
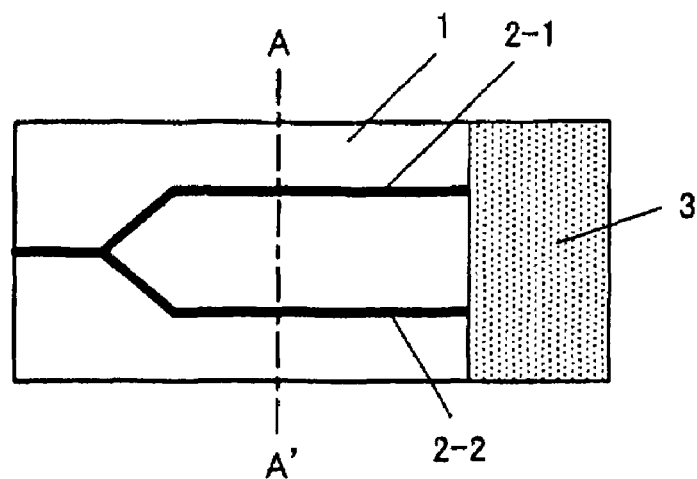
FIG. 1 is a schematic diagram showing the optical element related to the present invention.

FIG. 1 is a schematic diagram showing the optical element related to the present invention. Optical waveguides 2-1 and 2-2 are formed on the top face of a substrate 1 having an electrooptic effect. Although various patterns of the optical waveguides can be applied in accordance with the type of an optical modulator, a Mach-Zehnder type optical waveguide is mainly explained here.

An optical waveguide that is not shown in the figure is formed on the bottom face of substrate 1. The pattern of the bottom optical waveguide is almost the same as the pattern of the top optical waveguide in FIG. 1. The top optical waveguide and bottom optical waveguide are optically connected to form Mach-Zehnder type optical waveguide.

The substrate which configures the optical element is made of a material having an electrooptic effect, such as lithium niobate, lithium tantalate, PLZT (lead lanthanum zirconate titanate) or quartz-based material and the substrate is formed of an X cut plate, Y cut plate, and Z cut plate of these single crystal materials. It is preferable to use lithium niobate (LN) due to the fact that especially an optical waveguide device can be easily formed of the lithium niobate (LN) which have a large anisotropy.

A thermal diffusion method of Ti etc., or a proton exchange method can form the optical waveguide on the substrate.

3 indicates the turnback element for optically connecting the top optical waveguide and bottom optical waveguide.

The GRIN lens as disclosed in the patent document 1 can be applied as the turnback element, and besides, reflecting members such as a mirror and prism can be also applied.

Figure 2:
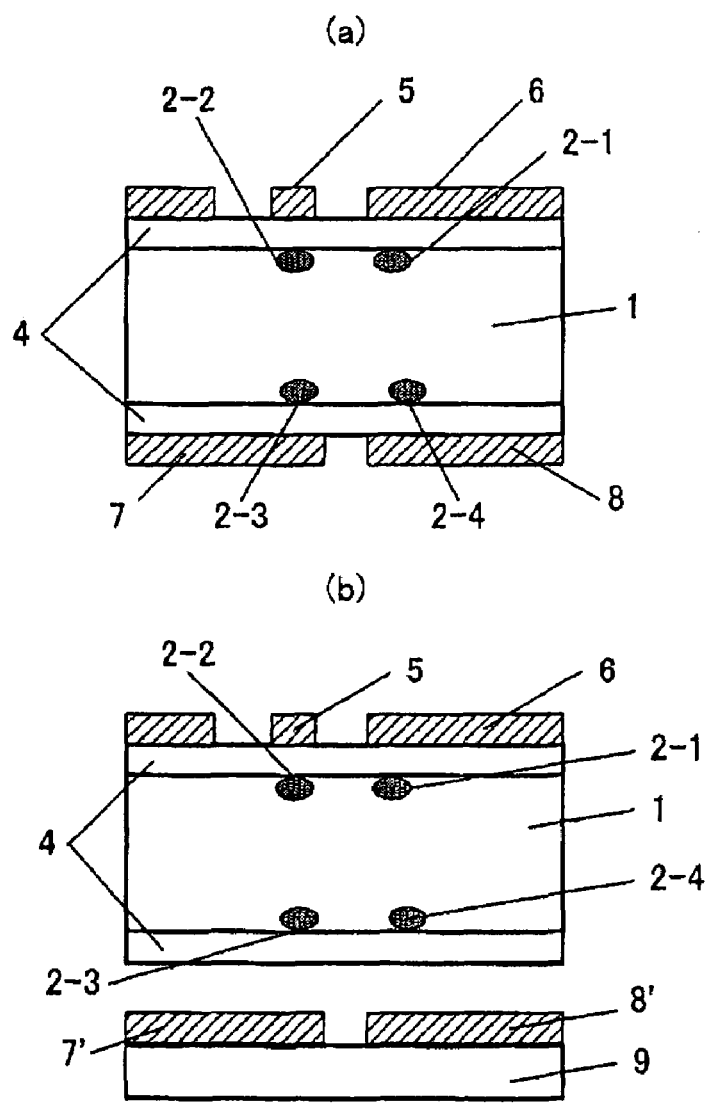
FIG. 2 are cross-section views of FIG. 1 along the chain line A to A'; (a) is a diagram showing the modulating electrode formed on the bottom face and (b) is a diagram showing the modulating electrode formed on the other plate-like body.

FIG. 2 are cross-section views of FIG. 1 along the chain line A-A'.

Optical waveguides 2-1 and 2-2, a buffer layer 4 composed of $SiO_2$ or the like, a signal electrode 5 and a ground electrode 6 that compose a modulating electrode are formed on the top face of substrate 1 as shown in FIG. 2(a).

At the same time, optical waveguides 2-3 and 2-4, a buffer layer 4 and DC bias electrodes 7 and 8 are formed on the bottom face of substrate 1.

Then, the top optical waveguide and bottom optical waveguide are optically connected by turnback element 3 such that optical waveguide "2-1" is connected to "2-4" and optical waveguide "2-2" to "2-3", or optical waveguide "2-1" is connected to "2-3" and optical waveguide "2-2" to "2-4". The light wave being propagated through the top optical waveguide is modulated and controlled by a high frequency electrical signal traveling through signal electrode 5. When it is further propagated through the bottom optical waveguide, it is controlled by DC bias electrodes 7 and 8.

This improves convenience of modulation control by separating the electrodes for the high frequency electrical signal and DC bias while the optical element can be downsized because the optical path of the light wave is turned back.

In FIG. 2(b), DC bias electrodes 7 and 8 on the bottom face in FIG. 2(a) are formed on the other plate-like body having insulation such that they are located adjacent to (closely-attached to or slightly away from) the bottom face of substrate 1.

As stated above, the electrodes on the bottom face are formed on another member apart from the substrate. Therefore, it is possible to simplify the production process for forming electrodes on the substrate itself while it becomes possible to control the magnitude and/or the direction of electric field applied into the optical waveguide on the substrate by adjusting the positional relation between the substrate and said plate-like body.

Although FIG. 2(b) shows the example of the DC bias electrodes on the bottom face, the present invention is not limited to this example, and it is possible to form only one part of the top modulating electrodes or bottom modulating electrodes on the other plate-like body and place it adjacent to the substrate. It also becomes possible to provide various functions of optical elements by preparing many kinds of electrode patterns to be formed on the plate-like body and changing the electrode pattern if necessary.

Next, the example of electrically connecting the top modulating electrode and bottom modulating electrode is explained.

Figure 3:
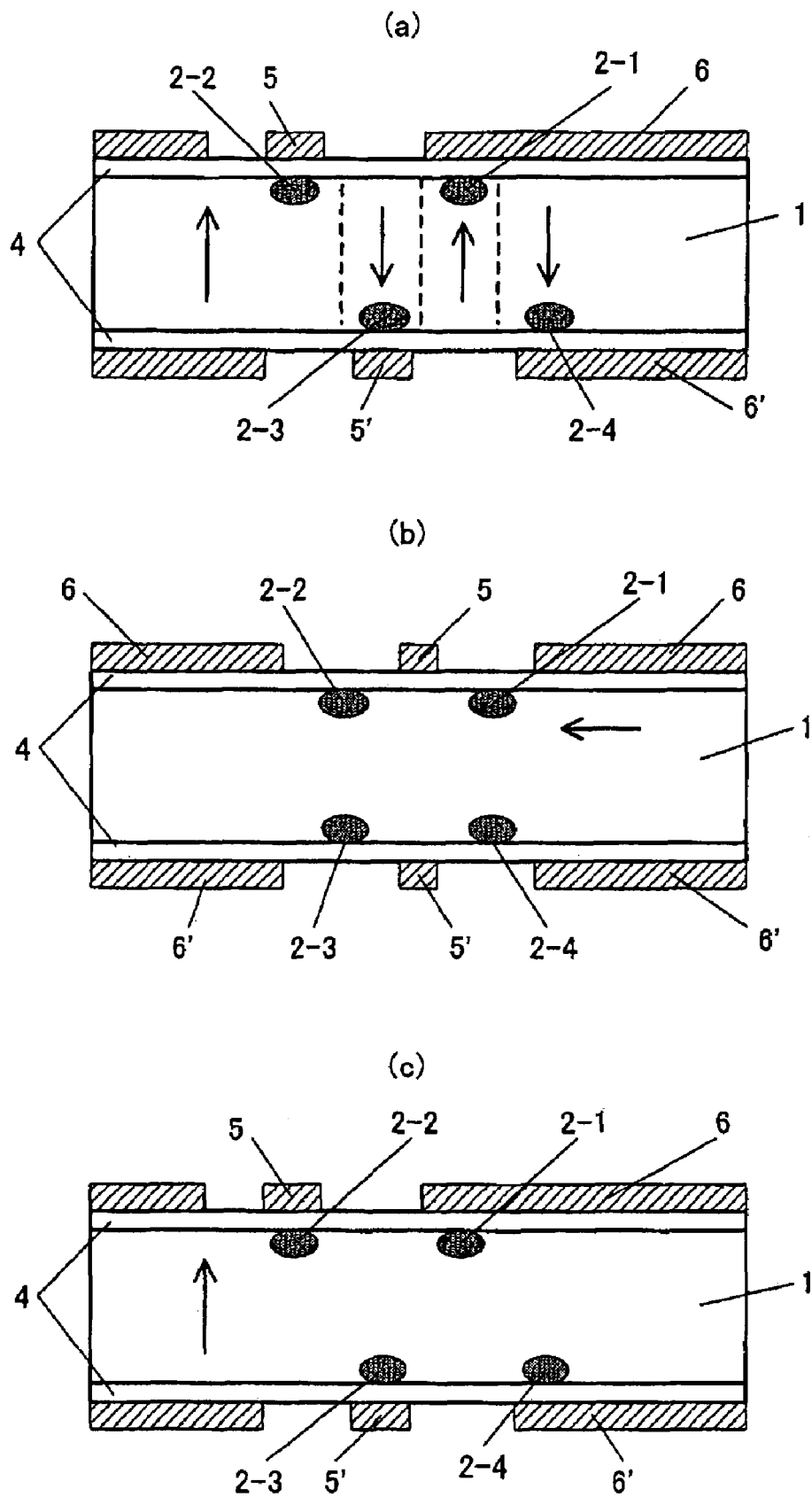
FIG. 3 are diagrams showing the examples of the optical element related to the present invention; (a) and (b) show in-phase condition and (c) shows anti-phase condition.

In FIG. 3, the Z cut plate is used as substrate 1. Optical waveguides 2-1, and 2-2, buffer layer 4, signal electrode 5 and ground electrode 6 are formed on the top face of substrate 1 like FIG. 2. At the same time, optical waveguides 2-3, and 2-4, buffer layer 4, a signal electrode 5' and a ground electrode 6' like the ones on the top face are formed on the bottom face of substrate 1.

Further, FSP of substrate 1 is reversed such that the top optical waveguide and bottom optical waveguide have different FSP directions. The arrows in FIG. 3(a) show the FSP directions of substrate 1. Optical waveguide 2-1 is optically connected to 2-4 and optical waveguide 2-2 is optically connected to 2-3 by the turnback element. Also, signal electrode 5 on the top face is connected to signal electrode 5' on the bottom face, and ground electrode 6 on the top face is connected to ground electrode 6' on the bottom face respectively.

When a light wave is introduced into the optical waveguide and a high frequency electrical signal is applied into signal electrode 5 in the optical element of FIG. 3(a), the high frequency electrical signal travels through signal electrode 5 together with the light wave being propagated through the optical waveguides across the top and bottom faces of the substrate. Therefore, it becomes possible to make electric field act continuously on the light wave and to lengthen the interaction length of the electrical signal traveling through the electrode and the light wave being propagated through the optical waveguide without changing the size of the optical modulator itself.

In FIG. 3(a), modulation of the propagated light wave by the top modulating electrode and modulation of the propagated light wave by the bottom modulating electrode are set to generate changes of reflective index having the same sign to each optical waveguide. Such modulation condition is called "in-phase condition". Also, when said modulations generate changes of refractive index having the opposite sign to each optical waveguide, it is called "anti-phase condition".

Specifically, focusing on the light wave being propagated through optical waveguide 2-2, the FSP direction of the optical waveguide 2-2 is upward as indicated by the arrow. When a positive voltage is applied by signal electrode 5, the electric field opposite to the FSP direction is generated. On the other hand, for optical waveguide 2-3, the FSP direction of the optical waveguide 2-3 is downward as indicated by the arrow. When a positive voltage is applied into signal electrode 5', the electric field opposite to the FSP direction is generated. In other words, when the light wave being propagated through top optical waveguide 2-2 of the substrate is propagated through bottom optical waveguide 2-3 of the substrate, the electric field opposite to the FSP direction of the optical waveguide is always applied into the propagated light wave by applying the positive voltage from the signal electrode.

Because the light waves are modulated equally both at the top and bottom faces of the substrate as stated above, it is possible to lengthen the substantial interaction length of the light wave without changing the size of the substrate and realize decreasing of driving voltage.

FIG. 3(b) shows the example of using the X cut plate as substrate 1.

Optical waveguides 2-1, and 2-2, buffer layer 4, signal electrode 5 and ground electrode 6 are formed on the top face of substrate 1 like FIG. 3(a). At the same time, optical waveguides 2-3, and 2-4, buffer layer 4, signal electrode 5' and ground electrode 6' like the ones on the top face are formed on the bottom face of substrate 1. The FSP direction of substrate 1 is leftward as indicated by the arrow in FIG. 3(b).

Then, optical waveguide 2-1 is optically connected to 2-4, and optical waveguide 2-2 is optically connected to 2-3 by the turnback element. Also, signal electrode 5 on the top face is connected to signal electrode 5' on the bottom face, and ground electrode 6 on the top face is connected to ground electrode 6' on the bottom face respectively.

Focusing on the light wave being propagated through optical waveguide 2-2, the FSP direction of the optical waveguide 2-2 is leftward as indicated by the arrow. When a positive voltage is applied by signal electrode 5, the electric field in the same direction as one of the FSP direction is generated. On the other hand, for optical waveguide 2-3, the FSP direction of the optical waveguide 2-3 is leftward as indicated by the arrow. When a positive voltage is applied by signal electrode 5', the electric field in the same direction as one of the FSP direction is generated. In other words, when the light wave being propagated through top optical waveguide 2-2 of the substrate is propagated through bottom optical waveguide 2-3 of the substrate, the electric field in the same direction as the FSP direction of the optical waveguide is always applied into the propagated light wave by applying the positive voltage into the signal electrode Therefore, in case of the X cut plate of FIG. 3(b), modulations of the propagated light wave by the top modulating electrode and by the bottom modulating electrode are set to have in-phase condition like FIG. 3(a).

FIG. 3(c) shows the example for using the Z cut plate as substrate 1.

Optical waveguides 2-1, and 2-2, buffer layer 4, signal electrode 5 and ground electrode 6 are formed on the top face of substrate 1 like FIG. 3(a). At the same time, optical waveguides 2-3, and 2-4, buffer layer 4, signal electrode 5' and ground electrode 6' like the ones on the top face are formed on the bottom face of substrate 1. The FSP direction of substrate 1 is upward as indicated by the arrow in FIG. 3(c).

Then, optical waveguide 2-1 is optically connected to 2-4, and optical waveguide 2-2 is optically connected to 2-3 by the turnback element. Also, signal electrode 5 on the top face is connected to signal electrode 5' on the bottom face, and ground electrode 6 on the top face is connected to ground electrode 6' on the bottom face respectively.

Focusing on the light wave being propagated through optical waveguide 2-2, the FSP direction of the optical waveguide 2-2 is upward as indicated by the arrow. When a positive voltage is applied by signal electrode 5, the electric field opposite to one of the FSP direction is generated. On the other hand, for optical waveguide 2-3, the FSP direction of the optical waveguide 2-3 is upward as indicated by the arrow. When a positive voltage is applied by signal electrode 5', the electric field in the same direction as one of the FSP direction is generated. In other words, when the light wave being propagated through top optical waveguide 2-2 of the substrate is propagated through bottom optical waveguide 2-3 of the substrate, the direction of electric field that is applied into the propagated light wave at the top face is opposite to the direction of electric field that is applied into the propagated light wave at the bottom face in relation to the FSP direction of the optical waveguide.

Therefore, in case of FIG. 3(c), modulation of the propagated light wave by the top modulating electrode and modulation of the propagated light wave by the bottom modulating electrode are set to have anti-phase condition.

Similar anti-phase condition like FIG. 3(c) can be also realized in FIGS. 3(a) and (b) by connecting optical waveguide 2-1 to 2-3, and connecting optical waveguide 2-2 to 2-4 as the connection method of each optical waveguide.

In addition, the direction of electric field is changed by adjusting the pattern of the modulating electrode or the location of the modulating electrode in relation to the optical waveguide to realize the anti-phase condition.

For example, because the location and pattern of the modulating electrode in relation to the optical waveguides 2-1 and 2-2 are different for each optical waveguide on the top face of FIG. 3(c), the intensity and direction of applied electric field on each optical waveguide become different (as to sign, it is normally in the opposite sign and that the direction is not opposite means being misaligned from the correct location or pattern). As a result, chirping is generated when the modulated light waves are joined.

However, due to such anti-phase condition, the sign of the chirping generated at the bottom face of the substrate is opposite to one of the chirping generated at the top face of the substrate. It results in chirping suppression in the optical element as a whole.

Subsequently, the example for using the present invention as a polarization-independent optical element is explained.

Figure 4:
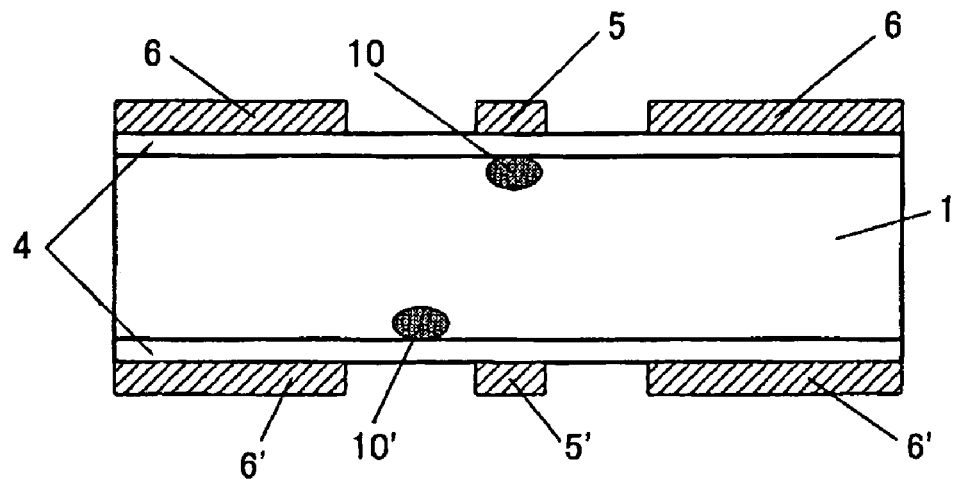
FIG. 4 is a diagram showing the polarization-independent optical element.

An optical waveguide 10, buffer layer 4, signal electrode 5 and ground electrode 6 are formed on the top face of substrate 1 in FIG. 4. At the same time, an optical waveguide 10', buffer layer 4, signal electrode 5' and ground electrode 6' like the ones on the top face are formed on the bottom face of substrate 1.

Then, optical waveguide 10 is optically connected to 10' by the turnback element. Also, signal electrode 5 on the top face is connected to signal electrode 5' on the bottom face, and ground electrode 6 on the top face is connected to ground electrode 6' on the bottom face respectively.

Focusing on the light wave being propagated through optical waveguide 10, when a high frequency electrical signal is applied by signal electrode 5, the electric field in a vertical direction to the substrate is applied into the propagated light wave. When it is propagated through optical waveguide 10', the electric field in a parallel direction to the substrate face is applied.

Thus, it becomes possible to modulate the light wave with both planes of polarization (the plane of polarization vertical to the substrate face and the plane of polarization parallel to the substrate face). In other words, the light wave having a random plane of polarization can be modulated without depending on the plane of polarization.

In addition, modulation efficiency also depends on the relation between the FSP direction of the substrate and the direction of electric field. Thus, when the configuration as in FIG. 4 is employed, it is preferable to adjust the interaction length that is the length of the interaction part in which the electric field of the modulating electrode acts on the light wave being propagated through the optical waveguide, the location of the optical waveguide and modulating electrode and the patterns of the modulating electrodes, the location and patterns having an influence on the intensity or direction of electric field, in order to equalize the modulation efficiency of each face of the substrate, although both X cut plate and Z cut plate can be applied as substrate 1.

Next, a method for electrical connection of the top modulating electrode and bottom modulating electrode is explained.

Figure 5:
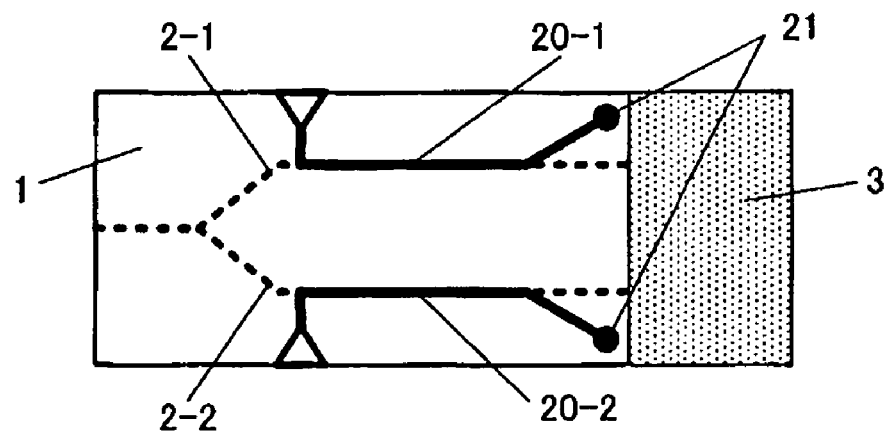
FIG. 5 is a diagram showing the first example of the electrical connection method of the optical element related to the present invention.

FIG. 5 shows the electrical connection method using via holes 21 that are lines penetrating substrate 1 from the top face to the bottom face. Via holes 21 are connected to the backend of a signal electrode 20-1 that applies electric field into optical waveguide 2-1, and a signal electrode 20-2 that applies electric field into optical waveguide 2-2.

On the bottom face of said via holes 21 are formed the optical waveguides and modulating electrodes like FIG. 5. The initial points of the signal electrodes on the bottom face are connected to the via holes that are lines penetrating substrate 1.

Figure 6:
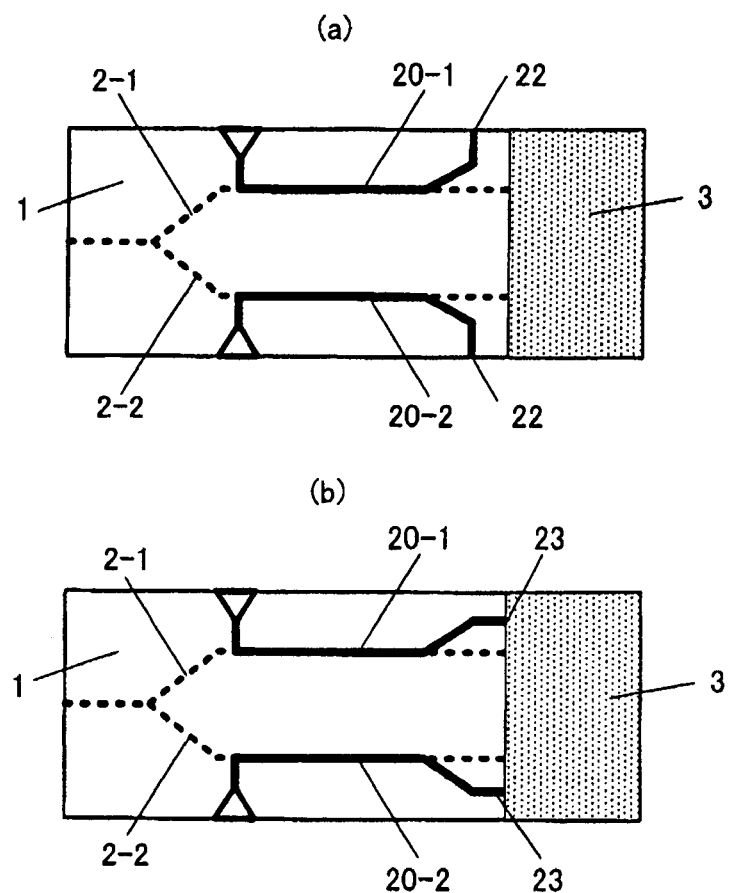
FIG. 6 are diagrams showing the second example of the electrical connection method of the optical element related to the present invention.

In FIG. 6, the lines connecting the top and bottom faces are formed on the side edge of substrate 1.

FIG. 6(a) shows lines 22 formed on the side edges which are parallel to a long side of substrate 1. FIG. 6(b) is a diagram showing lines 23 formed on the side of turnback element 3 of substrate 1.

Figure 7:
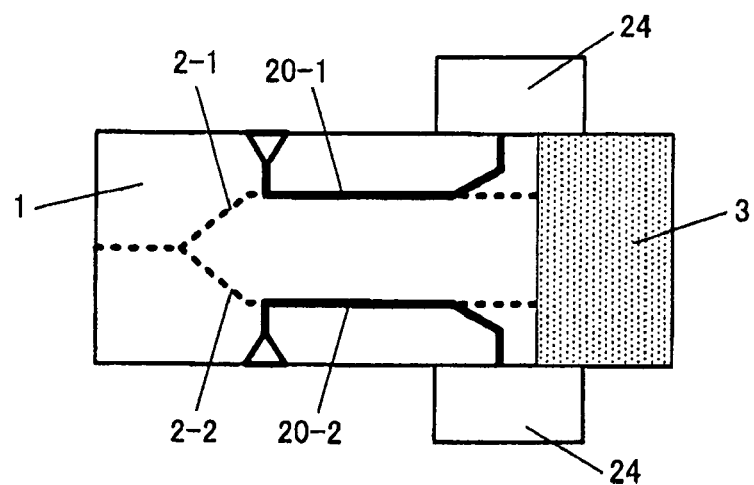
FIG. 7 is a diagram showing the third example of the electrical connection method of the optical element related to the present invention.

Further, it is possible to arrange a conductive member 24 (an insulating material having a conductive portion on its top face can be also used) on the side edge of substrate 1 instead of lines 22 shown in FIG. 6(a) and perform electric connection of the top and bottom faces by said conductive member as shown in FIG. 7. Moreover, it is possible to utilize one part of components such as case surrounding substrate 1, for example to incorporate a supporting member of substrate 1 into such conductive member.

The important thing in connecting the top modulating electrode and bottom modulating electrode of substrate 1 by the electric connection method as stated above is to synchronize the high frequency electrical signal traveling through the signal electrode and the light wave being propagated through the optical waveguide and turnback element 3.

In other words, it is necessary to set the length of connecting lines, the pattern of the signal electrode or the like such that the electric field synchronizes the light wave on the substrate top face and on the substrate bottom face.

Figure 8:
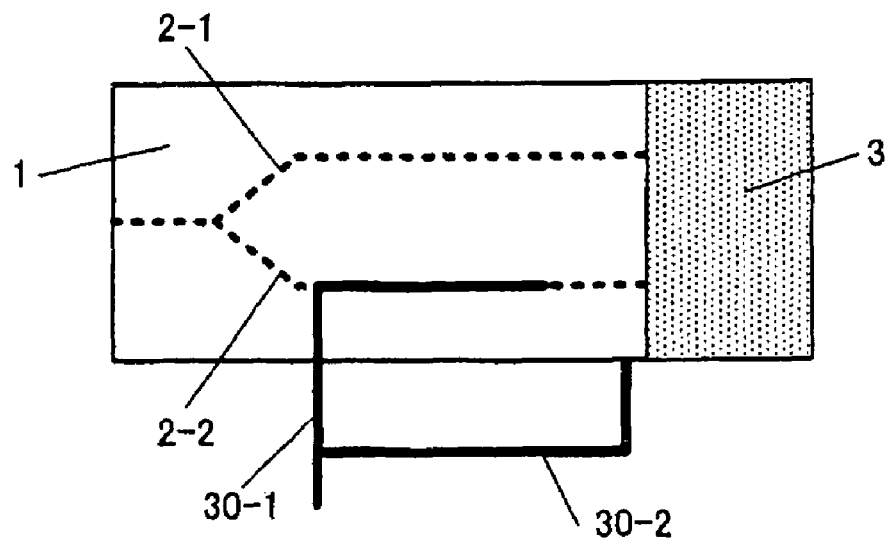
FIG. 8 is a diagram showing the fourth example of the electrical connection method of the optical element related to the present invention.

A method for dividing the input line on substrate 1 into two signal lines 30-1 and 30-2 and connecting signal line 30-1 to the top modulating electrode and signal line 30-2 to the bottom modulating electrode as shown in FIG. 8, can be cited as another method for applying the high frequency electrical signal into the top modulating electrode and bottom modulating electrode of substrate.

In this case, it is also necessary to adjust the length of the signal lines such that signal line 30-2 is set for a predetermined delay in order to synchronize the high frequency electrical signal traveling through the signal electrode and the light wave being propagated through the optical waveguide and turnback element 3.

As another method for adjusting the timing between the electric field formed by the high frequency electrical signal and the light wave, a method for synchronization by adjusting the optical length (physical length, refractive index of an optical path or the like) of the turnback related part of the light wave, and a method for modifying a delay between the modulating signal and light wave by adjusting the speed of the light wave or modulating signal at the turnback related part when a delay occurs before the turnback, can be cited.

In addition, when the modulating signal is continuous wave at a constant frequency, the modulating signal becomes the same signal at periodic cycle. Thus, synchronization is possible even when the timing is off between the modulating signal and the light wave. In other words, the points where the modulating signal can synchronize with light wave are more than once, i.e., at every period of the modulating signal.

Further, when the modulating signal is operated at a constant frequency, the modulating signal is delayed for half cycle of the optical signal which travels from top face. Then, new effects can be obtained.

For example, when the modulating signal and light wave are in-phase, chirping-suppressed modulation becomes possible as explained using FIG. 3(c). When the modulating signal is delayed for half cycle of the optical signal, the change of refractive index of the optical waveguide on the bottom face has in-phase condition as the top face. It becomes possible to realize decreasing of driving voltage as a result.

Therefore, when the frequency of the modulating electrode is constant, the modulating signal and light wave can be timed at every period. Also, it is possible to realize in-phase condition or anti-phase condition by adjusting the delay of the modulating signal and light wave without changing the FSP direction of the substrate having an electrooptic effect, the positional relation between the optical waveguide and modulating electrode, or the like.

Subsequently, the applications of the optical element according to the present invention are explained.

Figure 9:
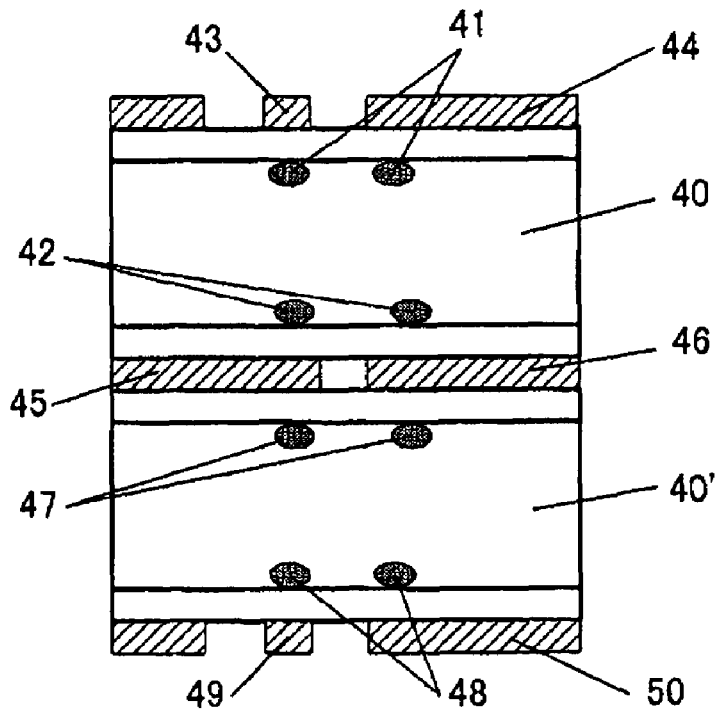
FIG. 9 is a diagram showing the example of stacking up the optical elements related to the present invention.

FIG. 9 is a diagram showing more multifunctional optical element by fabricating optical elements respectively on two substrates 40 and 40' and stacking them.

Optical waveguides 41, a signal electrode 43, and a ground electrode 44 are formed on the top face of substrate 40. Optical waveguides 42, DC electrodes 45 and 46 are formed on its bottom face like FIG. 2.

At the same time, optical waveguides 47 are formed on the top face of substrate 40'. Optical waveguides 48, a signal electrode 49 and a ground electrode 50 are formed on its bottom face.

After forming the optical waveguides and each electrode on substrate 40 and substrate 40', both substrates are stacked and fixed. As a result, DC electrodes 45 and 46 on the bottom face of substrate 40 can be also used as the electrodes on the top face of substrate 40'.

Due to this configuration, it becomes possible to stack up several optical modulators compactly while it becomes possible to eliminate one part of the production process of electrodes due to the common electrodes. Thus, there can be provided various functional optical element.

The multifunctional optical element as shown in FIG. 9 is not limited to the example but can be changed variously such as constituting the common electrode of the combination of the signal electrode on top face and one on bottom face or ground electrodes, and sharing the turnback element among several substrates. When the turnback element is shared, it is also possible to connect the light wave together on different substrates such as the light wave exiting from optical waveguide 41 on substrate 40 into optical waveguide 48 on substrate 40', and likewise, the light wave exiting from optical waveguide 42 on substrate 40 into optical waveguide 47 on substrate 40'.

Figure 10:
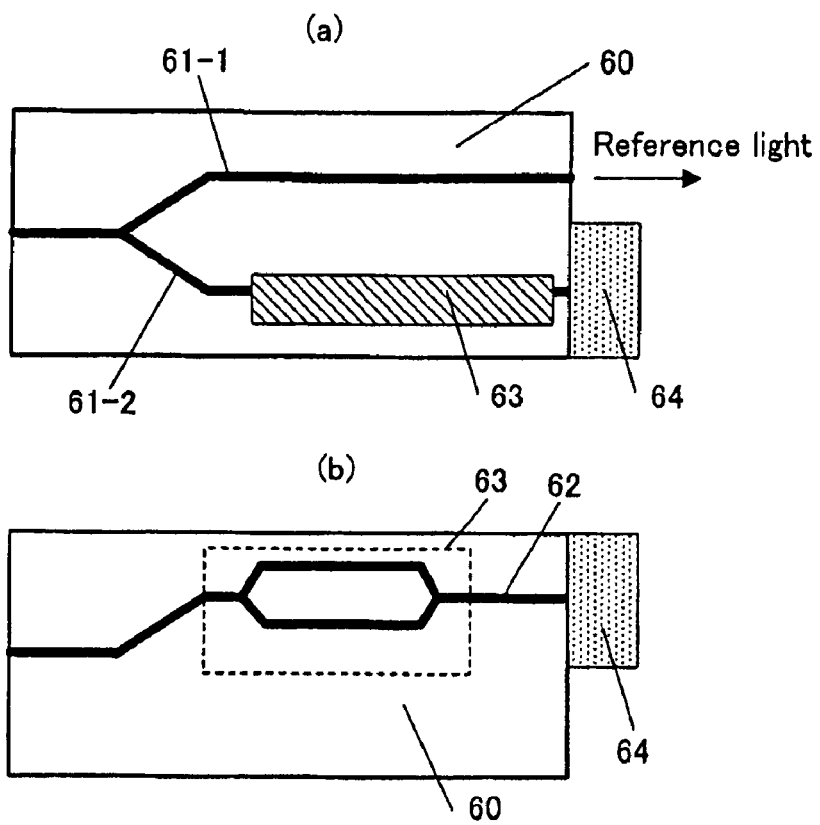
FIG. 10 are diagrams showing the first example of the method for taking out the reference light from the optical element related to the present invention; (a) is a schematic diagram of the upper side and (b) is a schematic diagram of the backside.
Figure 11:
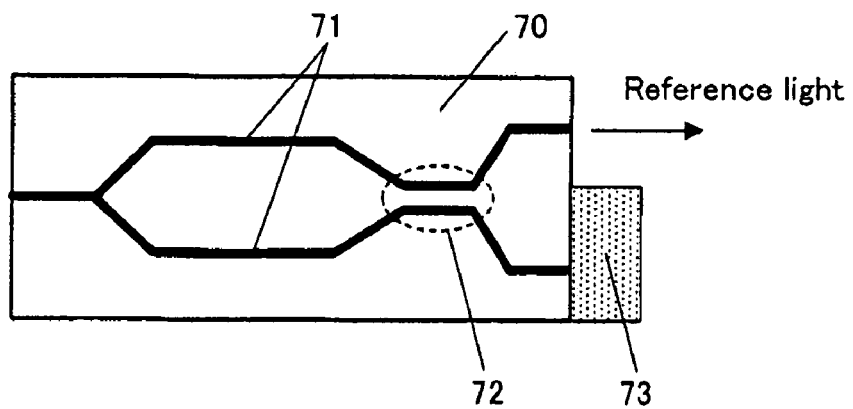
FIG. 11 is a diagram showing the second example of the method for taking out the reference light from the optical element related to the present invention.
Figure 12:
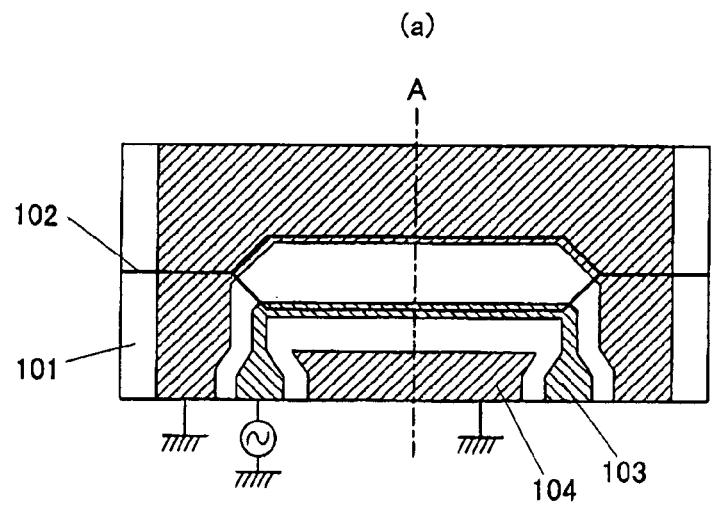
FIG. 12 are diagrams showing the conventional optical element using the single modulating electrode.
Figure 12:
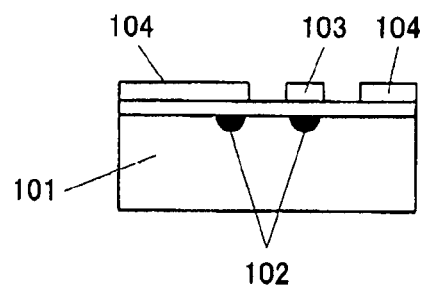
Figure 13:
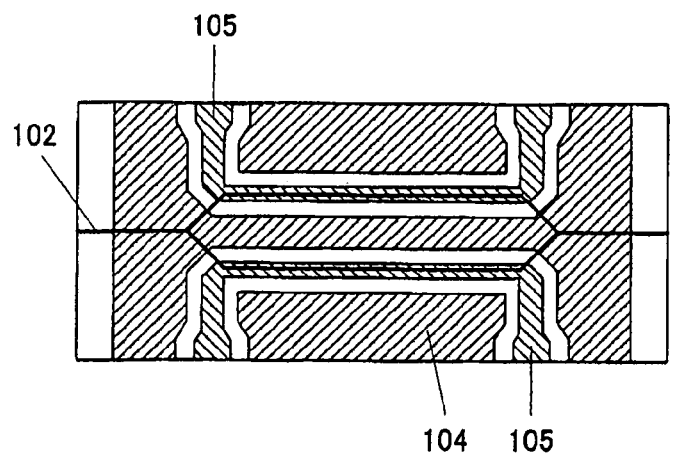
FIG. 13 is a diagram showing the conventional optical element using the two modulating electrodes.

Next, the method for taking out one portion of the light wave being propagated through the optical element as the reference light is shown in FIGS. 10 and 11.

FIG. 10(a) is a schematic diagram of the top face and FIG. 10(b) is a schematic diagram of the bottom face of the optical element. Branching waveguides 61-1 and 61-2 are formed as an optical waveguide on the top face of a substrate 60. It is configured such that the reference light exits to the outside of the optical element from the side edge of branching waveguide 61-1.

On the other hand, branching waveguide 61-2 is provided with an electrode for phase modulation 63 and at the same time, optically connected to an optical waveguide 62 on its bottom face by a turnback element 64. An intensity modulation part 63 connected to optical waveguide 62 is formed on the bottom face. This is configured to further modulate the intensity of the light wave that is phase modulated on the top face.

FIG. 11 is a schematic view of the top face of a substrate 70. A directional coupler 72 is connected to a Mach-Zehnder type optical waveguide 71 to form the optical waveguide on substrate 70.

One way of the light wave exiting from directional coupler 72 exits to the outside as the reference light and the other way of the light wave is introduced into the bottom face by a turnback element 73.

As shown in FIGS. 10 and 11, the branching waveguide that divides one part of the optical waveguide, the directional coupler or the like are used to easily take out the reference light for monitoring the wavelength or the intensity of the light wave being propagated through the optical element.

Next, an optical element capable of wiring a modulating electrode on the optical element having complicated optical waveguides such as an optical waveguide turned back at one side edge of a substrate, and further capable of realizing low driving voltage or zero chirp, which are the second object of the present invention, is explained.

Figure 16:
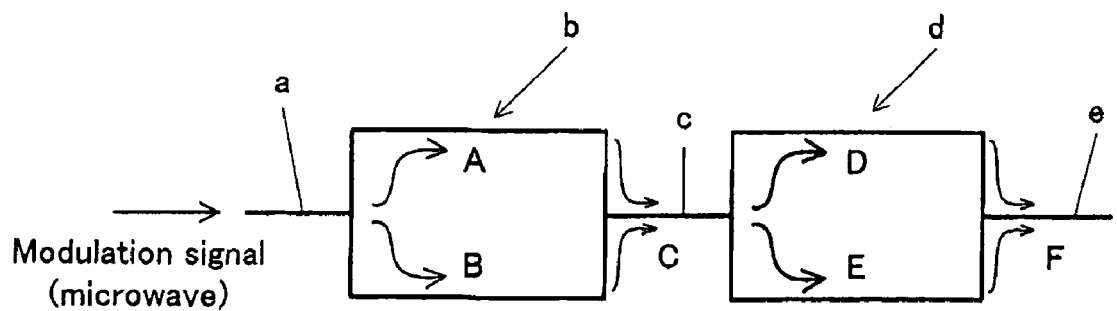
FIG. 16 is a diagram showing the basal principle of the modulating electrode related to the present invention.

FIG. 16 is a diagram showing the basic principle of the modulating electrode that is used for the optical element according to the present invention. The modulating electrode is comprised of, for example, a feeder a, a first branching and confluence line b, a middle line c, a second branching and confluence line d, and an output e. It is also possible to add branching and confluence line further, if necessary.

The microwave inputted from feeder a is divided into two microwaves A and B at the first branching and confluence line b, and then, combined into a single microwave C again at middle line c for the modulating electrode as in FIG. 16. Further, this is likewise divided into two microwaves D and E at the second branching and confluence line d and combined into a single microwave F at output e. In addition, at the last side edge of the modulating electrode, it is also possible to directly connect terminators to the side edge of the branching lines of the branching and confluence line without providing output e as in FIG. 16.

Because divided microwaves A, B, D and E are respectively applied into optical waveguides, they can be divided into suitable intensity ratio in accordance with the positional relation between each optical waveguide and branched modulating electrode or the pattern (such as length, width and height of electrode) of each modulating electrode. Normally, the modulating electrodes, into which the divided microwaves A and B, or D and E, are applied, are symmetric on both sides. Therefore, they are divided such that they have the same intensity. Also, when the divided microwaves are combined, the phase difference of the divided microwaves is adjusted to substantially zero in order to increase the intensity of the microwaves. When the optical element is modulated by a standing wave, it is also possible to adjust the phase difference so as to correspond to the integral multiplication of the standing wave cycle.

Figure 14:
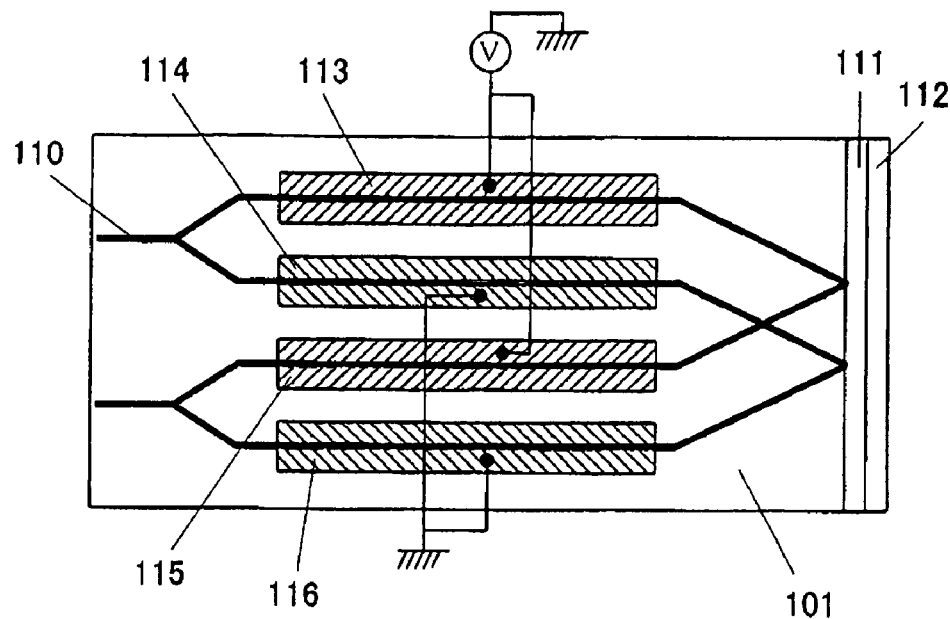
FIG. 14 is a diagram showing the conventional optical element using the turnback optical waveguide.
Figure 15:
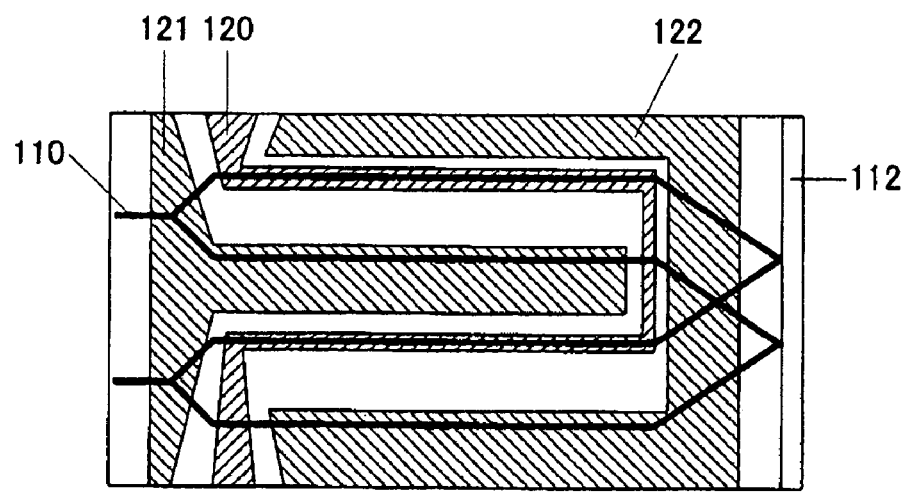
FIG. 15 is a diagram showing the conventional optical element using the turnback optical waveguide and single modulating electrode.

Subsequently, the embodiment of applying the above described modulating electrode to the optical element having the turnback optical waveguide as shown in FIG. 14 is explained.

Figure 17:
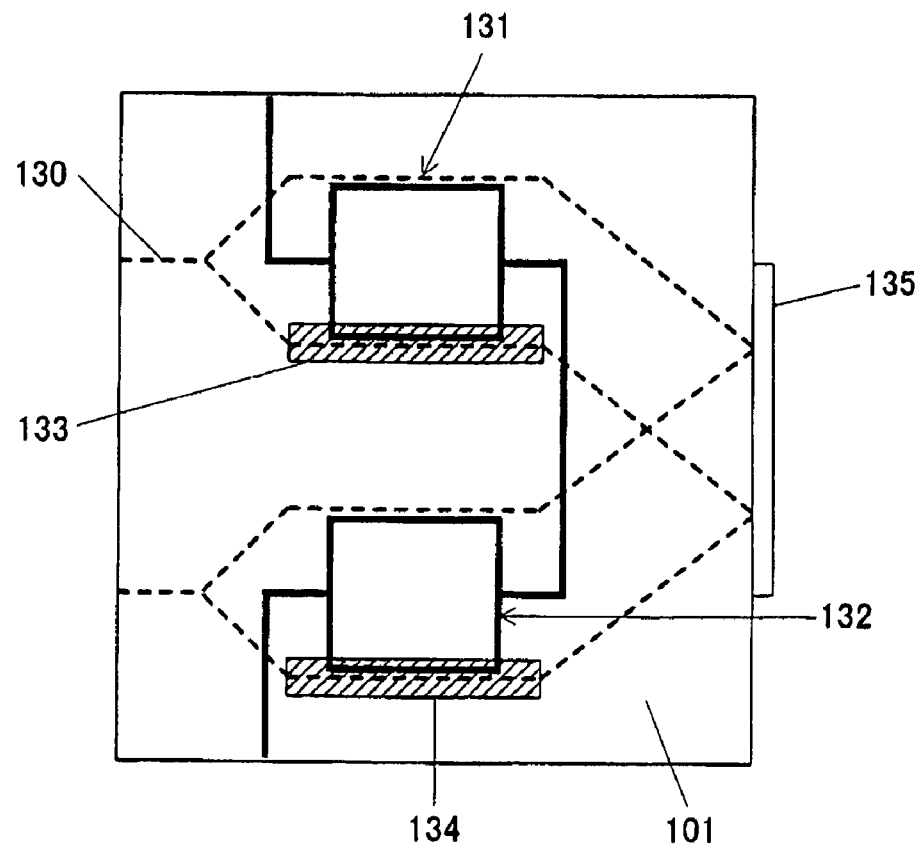
FIG. 17 is a diagram showing the first example of the optical element using the branching and confluence lines related to the present invention.

FIG. 17 shows a MZ type optical waveguide 130 turned back at the side edge of a substrate 101. A reflecting mirror 135 for increasing reflection efficiency is placed at the turnback part of the optical waveguide.

Although it is obviously possible to apply the above described various kinds of substrates as substrate 101 having an electrooptic effect, the example using the Z cut plate is shown in FIG. 17 in view of easiness of forming FSP reversal as stated below.

Diffusing Ti etc. on the substrate surface by a thermal diffusion method or proton exchange method can form an optical waveguide 130 on the substrate. In addition, the signal electrode and the ground electrode can be formed by the formation of an Au electrode pattern, a gold plating method or the like. Further, it is possible to provide a buffer layer such as dielectric $SiO_2$ on the substrate surface after forming the optical waveguide if necessary, and to apply ridge structure to this structure such that the electric field formed by the modulating electrode effectively modulates the light wave on the waveguide.

Two branching and confluence lines 131 and 132 of the modulating electrode are positioned before and behind the turnback of the optical waveguide. Also, FSP reversal regions 133 and 134 having a FSP direction opposite to the substrate are formed on one part of the interaction part of the divided lines of the branching and confluence line and the branching optical waveguide 130. The same in-phase modulating signal is applied into each branching optical waveguide by the divided lines at the region of each branching and confluence line like the optical element described in the patent document 2 while optical modulation is performed in anti-phase condition at the FSP reversal region of the branching optical waveguide. Thus, it becomes possible to decrease driving voltage related to the optical modulation or suppress chirping.

Further, the single middle line connects two branching and confluence lines 131 and 134. Thus, although there exist two modulating electrodes at the interaction part performing the optical modulation, there is no crossed line in wiring.

Figure 18:
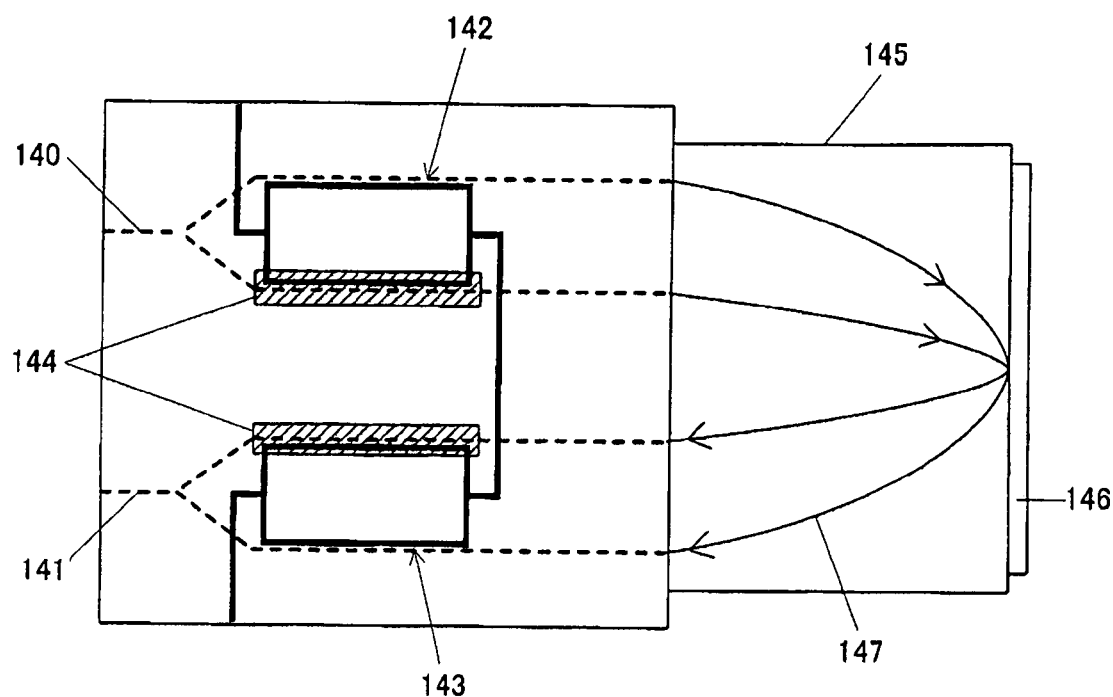
FIG. 18 is a diagram showing the second example of the optical element using the branching and confluence lines related to the present invention.

FIG. 18 shows the second embodiment of the optical element using the branching and confluence lines according to the present invention, wherein MZ type optical waveguides 140 and 141 are turned back by a GRIN lens 145 and a reflecting mirror 146 attached to one side edge of said lens. The light wave exiting from an optical waveguide 140 at the input side follows the locus shown by 147 and enters an optical waveguide 141 at the output side. The modulating electrode having two branching and confluence lines 142 and 143 is placed on each optical waveguide 140 and 141 like FIG. 17. FSP reversal regions 144 are also formed on one part of each optical waveguide to be operated like FIG. 17.

Figure 19:
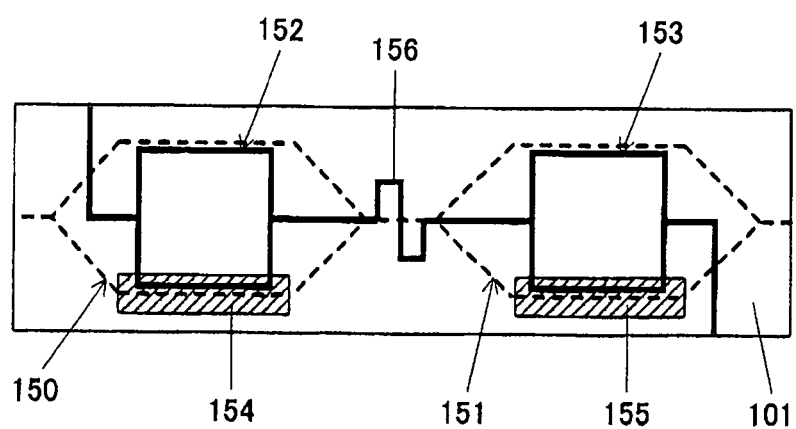
FIG. 19 is a diagram showing the third example of the optical element using the branching and confluence lines related to the present invention.

Subsequently, the third embodiment of the optical element using the branching and confluence lines according to the present invention is shown in FIG. 19.

FIG. 19 shows the optical waveguide where MZ type optical waveguides 150 and 151 are located in series on substrate 101. Using such several MZ type optical waveguides enables the light wave being optical-modulated in one MZ type optical waveguide to be again optical-modulated by another MZ type optical waveguide. Especially when it is modulated by the same modulating signal, it is possible to improve extinction ratio related to the modulation.

In FIG. 19, two branching and confluence lines 152 and 153 are located corresponding to the interaction part of each MZ type optical waveguide. FSP reversal regions 154 and 155 are also formed on one part of each branching optical waveguide. Because the single middle line connects each branching and confluence line 152 and 153, it becomes easy to wire the lines as well as it becomes possible to apply the modulating signals having the same intensity into two branching optical waveguide at each MZ type optical waveguide. For example, when two lines over both MZ type optical waveguides are used (when two lines are connected from the branching optical waveguide of one MZ type optical waveguide to the branching optical waveguide of the other MZ type optical waveguide) instead of the modulating electrode in FIG. 19, propagation loss or phase of microwaves between each line results in difference if the gap between the MZ type optical waveguides gets longer. Then, it becomes difficult to apply a proper modulating signal into the next MZ type optical waveguide. On the other hand, when the single middle line is used as described above, a modulating signal is always traveled on the single line when it is applied into a new MZ type optical waveguide. After that, it is divided into two branching modulating signals by the branching and confluence line. As a result, it becomes possible to obtain the modulating signal having a prescribed intensity at each branching optical waveguide of the MZ type optical waveguides.

It is also possible to form a delay line 156 of the modulating signal in the middle line as shown in FIG. 19 to adjust the timing between the electrical signal and the light wave entering on the next MZ type optical waveguide 151.

FIG. 20 shows the fourth embodiment of the optical element using the branching and confluence lines according to the present invention, wherein two MZ type optical waveguide of FIG. 19 are configured by the turnback. A reflecting mirror 166 is formed at the turnback. Branching and confluence lines 162 and 163, and FSP reversal regions 164 and 165 are formed on each MZ type optical waveguide 160 and 161. Further, it is also possible to form a delay line 167 for the purposes of adjusting the timing between the light wave entering the next MZ type optical waveguide 161 and the modulating signal.

FIG. 21 shows the fifth embodiment of the optical element using the branching and confluence lines according to the present invention, wherein two branching and confluence lines 170 and 171 are provided for two MZ type optical waveguides 173 and 174. Especially, branching and confluence line 170 is configured to be capable of adjusting the phase difference of the modulating signals applied into each branching optical waveguide by forming delay line 172. Further, another delay line 172 is formed for the purpose of adjusting the phase difference in the confluence to substantially zero (When the modulating signal is modulated by a standing wave, it is also possible to adjust the phase difference to the integral multiplication of the modulation cycle). In addition, when the delay line is not formed, it is also possible to provide a FSP reversal region 175 as above stated.

The present invention is not limited to the above embodiments, but it is obviously possible to combine well known technologies in the art such as impedance matching before or after branching in order to prevent reflection of the microwaves on branching.

As above stated, the present invention can provide the highly-integrated and compact optical element, and further, it can provide the optical element having various functions such as lower driving voltage, chirping suppression and polarization-independency.

In addition, it is possible to provide the optical element capable of wiring the modulating electrode against the optical element even having complicated optical waveguides such as the one turned back at one side edge of the substrate, and further, capable of realizing low driving voltage or zero chirp.

The invention claimed is:

1. An optical element comprising
   a substrate formed of a material having an electrooptic effect,
   a plurality of optical waveguides formed on said substrate, and
   a modulating electrode for applying electric field into said optical waveguides, wherein said modulating electrode comprises at least two branching and confluence lines on a same line for applying a same modulating signal into different optical waveguides, and
   wherein one portion of said optical waveguides is turned back at a side edge of said substrate, and the branching and confluence lines on the same line are respectively positioned at least before and behind said turnback of optical waveguide.

2. The optical element according to claim 1, wherein said optical waveguides comprise a plurality of Mach-Zehnder type optical waveguides being connected in series, and a plurality of branching and confluence lines on a same line are located corresponding to each of said Mach-Zehnder type optical waveguides.

3. The optical element according to claim 1, wherein a ferroelectric spontaneous polarization of one part of said substrate comprising the optical waveguides, into which electric field is applied by said branching and confluence lines, is reversed.

4. The optical element according to claim 2, wherein a ferroelectric spontaneous polarization of one part of said substrate comprising the optical waveguides, into which electric field is applied by said branching and confluence lines, is reversed.

5. The optical element according to claim 1, wherein at least one of said branching and confluence lines has one or more delay lines between a branching point and a confluence point.

6. The optical element according to claim 2, wherein at least one of said branching and confluence lines has one or more delay lines between a branching point and a confluence point.

7. The optical element according to claim 3, wherein a middle line between said branching and confluence lines has a delay line.

8. The optical element according to claim 4, wherein a middle line between said branching and confluence lines has a delay line.

9. The optical element according to claim 5, wherein a middle line between said branching and confluence lines has a delay line.

10. The optical element according to claim 6, wherein a middle line between said branching and confluence lines has a delay line.

11. An optical element comprising
    a substrate formed of a material having an electrooptic effect,
    a plurality of optical waveguides formed on said substrate, and
    a modulating electrode for applying electric field into said optical waveguides, wherein said modulating electrode comprises at least two branching and confluence lines on a same line for applying a same modulating signal into different optical waveguides, and
    wherein said optical waveguides comprise a plurality of Mach-Zehnder type optical waveguides being connected in series, and a plurality of branching and confluence lines on a same line are located corresponding to each of said Mach-Zehnder type optical waveguides.

12. The optical element according to claim 11, wherein a ferroelectric spontaneous polarization of one part of said substrate comprising the optical waveguides, into which electric field is applied by said branching and confluence lines, is reversed.

13. The optical element according to claim 11, wherein at least one of said branching and confluence lines has one or more delay lines between a branching point and a confluence point.

14. The optical element according to claim 12, wherein a middle line between said branching and confluence lines has a delay line.

15. The optical element according to claim 13, wherein a middle line between said branching and confluence lines has a delay line.

* * * * *